(12) United States Patent
Viswanatha et al.

(10) Patent No.: US 12,146,962 B2
(45) Date of Patent: Nov. 19, 2024

(54) TECHNIQUES FOR LIDAR SYSTEM NOISE CALIBRATION AND COMPENSATION FOR IMPROVED TARGET DETECTION

(71) Applicant: AEVA, INC., Mountain View, CA (US)

(72) Inventors: Kumar Bhargav Viswanatha, Santa Clara, CA (US); Jose Krause Perin, Mountain View, CA (US); Rajendra Tushar Moorti, Mountain View, CA (US); Mina Rezk, Haymarket, VA (US)

(73) Assignee: AEVA, Inc., Mountain View, CA (US)

( * ) Notice: Subject to any disclaimer, the term of this patent is extended or adjusted under 35 U.S.C. 154(b) by 1003 days.

(21) Appl. No.: 17/120,858

(22) Filed: Dec. 14, 2020

(65) Prior Publication Data
US 2022/0057515 A1 Feb. 24, 2022

Related U.S. Application Data

(62) Division of application No. 16/996,706, filed on Aug. 18, 2020, now Pat. No. 10,884,130.

(51) Int. Cl.
G01S 17/34 (2020.01)
G01S 7/481 (2006.01)
G01S 17/89 (2020.01)
G01S 17/931 (2020.01)

(52) U.S. Cl.
CPC ............ *G01S 17/89* (2013.01); *G01S 7/4813* (2013.01); *G01S 17/34* (2020.01); *G01S 17/931* (2020.01)

(58) Field of Classification Search
None
See application file for complete search history.

(56) References Cited

U.S. PATENT DOCUMENTS

| | | | |
|---|---|---|---|
| 10,267,918 B2 | 4/2019 | LaChapelle et al. |
| 10,401,480 B1 | 9/2019 | Gaalema et al. |
| 2013/0258312 A1 | 10/2013 | Lewis |
| 2018/0074198 A1 | 3/2018 | Von Novak et al. |
| 2018/0284245 A1 | 10/2018 | LaChapelle et al. |

(Continued)

FOREIGN PATENT DOCUMENTS

| | | |
|---|---|---|
| JP | 2004177350 A | 6/2004 |
| JP | 2004257961 A | 9/2004 |

(Continued)

OTHER PUBLICATIONS

International Search Report by International Searching Authority for PCT/US2020/048745 mailed May 11, 2021.

(Continued)

*Primary Examiner* — Eric L Bolda
(74) *Attorney, Agent, or Firm* — Womble Bond Dickinson (US) LLP

(57) ABSTRACT

A light detection and ranging (LIDAR) system to generate a baseband signal in the time domain from the return signal, where the baseband signal includes frequencies corresponding to LIDAR target ranges; and a signal processing system coupled with the optical processing system to measure energy of the baseband signal in the frequency domain, to compare the energy to an estimate of LIDAR system noise, and to determine a likelihood that an signal peak in the frequency domain indicates a detected target.

20 Claims, 13 Drawing Sheets

(56) References Cited

U.S. PATENT DOCUMENTS

| | | | |
|---|---|---|---|
| 2019/0094352 A1 | 3/2019 | Altenmueller et al. | |
| 2019/0310372 A1 | 10/2019 | Crouch et al. | |
| 2019/0339359 A1 | 11/2019 | Wang et al. | |
| 2020/0284883 A1 | 9/2020 | Ferreira et al. | |
| 2021/0293960 A1* | 9/2021 | Kreitinger | G01S 7/4917 |
| 2022/0011423 A1* | 1/2022 | Li | G01S 7/023 |

FOREIGN PATENT DOCUMENTS

| | | |
|---|---|---|
| JP | 2019004146 A | 1/2019 |
| JP | 2019138446 | 1/2022 |

OTHER PUBLICATIONS

Office Action of Application No. JP 2023-512265 Dated Apr. 23, 2024, 3 pages.

* cited by examiner

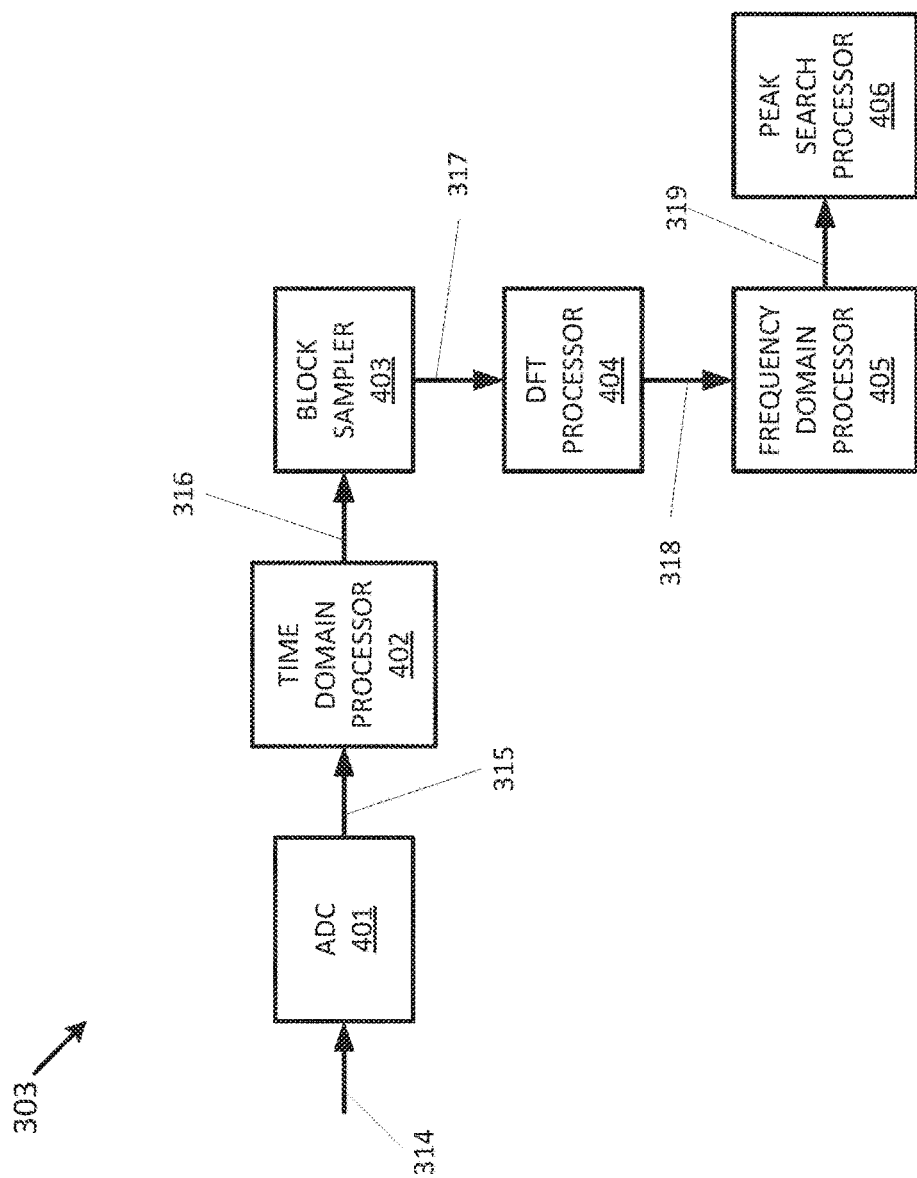

TECHNIQUES FOR LIDAR SYSTEM NOISE CALIBRATION AND COMPENSATION FOR IMPROVED TARGET DETECTION

CROSS REFERENCE TO RELATED APPLICATION

The application is a divisional of U.S. patent application Ser. No. 16/996,706, filed Aug. 18, 2020, the entire contents of which are hereby incorporated by reference.

FIELD

The present disclosure is related to LIDAR (light detection and ranging) systems in general, and more particularly to noise calibration and compensation in FMCW (frequency-modulated continuous-wave) LIDAR systems for target detection.

BACKGROUND

Frequency-Modulated Continuous-Wave (FMCW) LIDAR systems use tunable, infrared lasers for frequency-chirped illumination of targets, and coherent receivers for detection of backscattered or reflected light from the targets that are combined with a local copy of the transmitted signal. Mixing the local copy with the return signal, delayed by the round-trip time to the target and back, generates signals at the receiver with frequencies that are proportional to the distance to each target in the field of view of the system. Human safety considerations mandate the use of low-power lasers so that reflections from objects have very low signal strength. The range and accuracy of a LIDAR system is a function of signal-to-noise ratio, yet conventional solutions fail to reliably determine the noise characteristics of the LIDAR system in order to properly interpret return signals.

SUMMARY

The present disclosure describes examples of systems and methods for calibrating LIDAR system noise and for compensating for system noise characteristics to improve target detection.

In one example, LIDAR system includes an optical scanner to transmit an FMCW (frequency-modulated continuous wave) infrared (IR) optical beam and to receive a return signal from reflections of the optical beam, an optical processing system coupled with the optical scanner to generate a baseband signal in the time domain from the return signal, where the baseband signal contains frequencies corresponding to LIDAR target ranges, and a signal processing system coupled with the optical processing system to compare signal peaks of the baseband signal with an estimate of LIDAR system noise in the frequency domain and to identify likely targets based on the comparison.

In one example, the estimate of the LIDAR system noise is one of an anechoic factory calibration, a low-power boot-up calibration, an anechoic calibration in an occluded field of view, and a target-absent calibration, and where the signal peaks are based on one or more of signal energy across frequency bins of the baseband signal, autocorrelation of the baseband signal across the frequency bins, and cross-correlation between the baseband signal and the system noise estimate across the frequency bins.

In one example, the estimate of LIDAR system noise further includes a measurement of one or more of noise energy, a first moment of the noise energy (mean), a second moment of the noise energy (variance), a third moment of the noise energy (asymmetry), and a fourth moment of the noise energy (kurtosis).

In one example, the signal processing system may identify a likely target by selecting the highest signal peak independent of the system noise estimate; or by selecting the highest signal peak that exceeds a signal-to-noise threshold based on the LIDAR system noise estimate; or by selecting the signal peak with the highest signal-to-noise ratio; or by selecting the signal peak with the highest non-negative (signal-noise)/noise ratio.

In one example, to identify a likely target, the signal processing system may mask frequencies below a minimum threshold frequency in the baseband signal to mitigate internal reflections in the LIDAR system; or mask frequencies above a maximum threshold frequency in the baseband signal to mitigate aliasing due to Doppler shifts; or increase a variance of the noise estimate to compensate for non-stationary noise; or track impulse noise in a database and mask corresponding frequencies in the baseband signal.

In one example, a method in an FMCW LIDAR system includes generating an estimate of system noise in the system by measuring a baseband signal when the system is in a calibration state, where the baseband signal contains frequencies corresponding to LIDAR target ranges; generating the baseband signal in the system from a target return signal when the system is in a target detection mode; comparing the baseband signal generated in the target detection mode to the estimate of system noise; and determining a likelihood that an signal peak in the frequency domain indicates a detected target.

In one example, a non-transitory computer-readable medium in an FMCW LIDAR system includes instructions that, when executed by a processing device in the system, cause the system to generate a system noise estimate in the FMCW LIDAR system by measuring a baseband signal when the system is in an anechoic calibration state, where the baseband signal contains frequencies corresponding to LIDAR target ranges, where the system noise estimate includes one or more of a noise energy, a first moment of the system noise energy (mean), a second moment of the system noise energy (variance), a third moment of the system noise energy (asymmetry), and a fourth moment of the system noise energy (kurtosis); generate the baseband signal in the FMCW LIDAR system from a target return signal when the system is in a target detection mode; compare the baseband signal generated in the target detection mode to the estimate of system noise; and determine a likelihood that a signal peak in the frequency domain indicates a detected target.

BRIEF DESCRIPTION OF THE DRAWINGS

For a more complete understanding of various examples, reference is now made to the following detailed description taken in connection with the accompanying drawings in which like identifiers correspond to like elements:

FIG. 4 is a block diagram of an example signal processing system according to the present disclosure;

DETAILED DESCRIPTION

The present disclosure describes various examples of LIDAR systems and methods for calibrating LIDAR system noise and for compensating for system noise characteristics to improve target detection. According to some embodiments, the described LIDAR system may be implemented in any sensing market, such as, but not limited to, transportation, manufacturing, metrology, medical, and security systems. According to some embodiments, the described LIDAR system is implemented as part of a front-end of frequency modulated continuous-wave (FMCW) device that assists with spatial awareness for automated driver assist systems, or self-driving vehicles.

Figure 1:
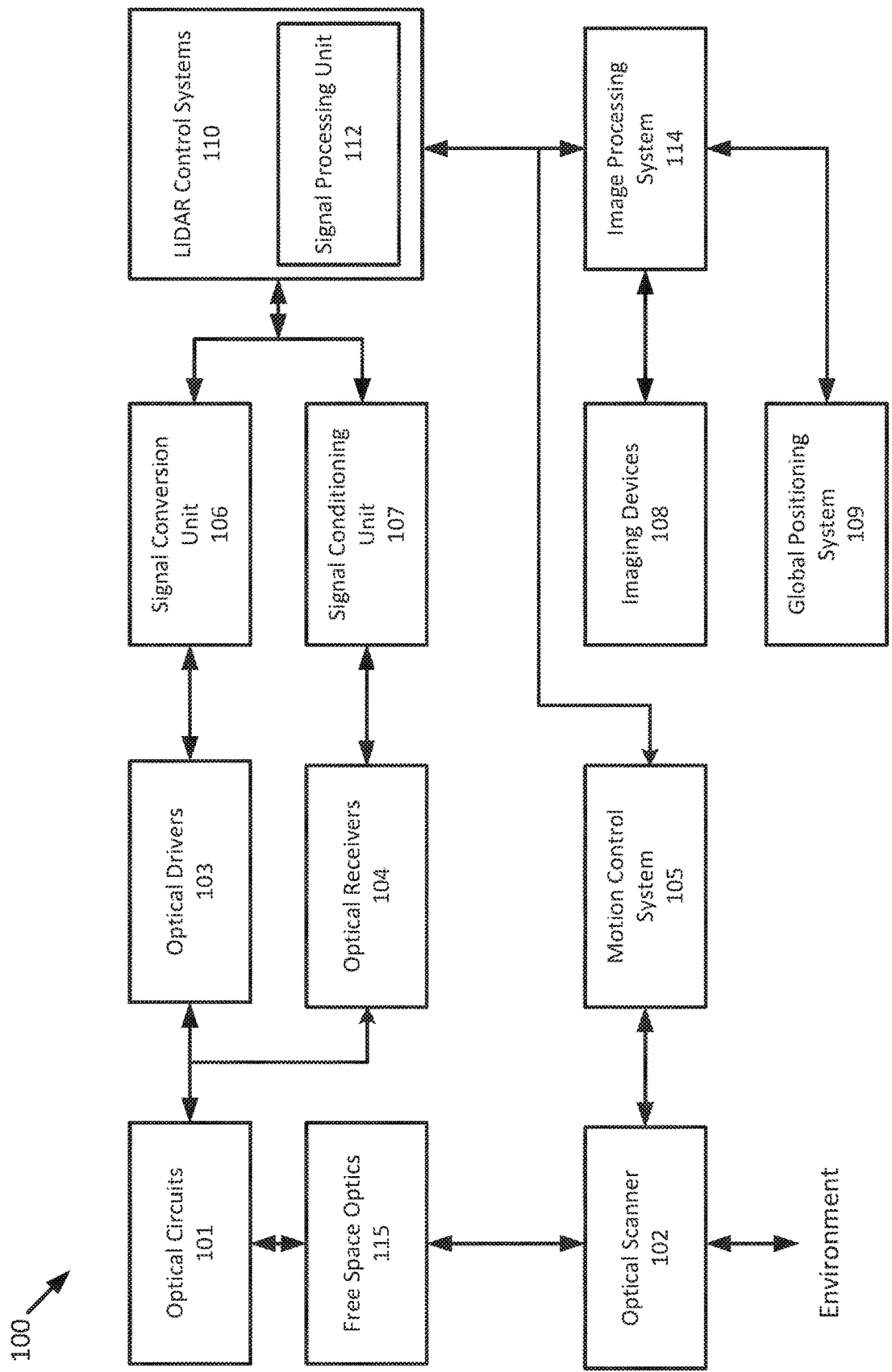
FIG. 1 is a block diagram illustrating an example LIDAR system according to the present disclosure.

FIG. 1 illustrates a LIDAR system 100 according to example implementations of the present disclosure. The LIDAR system 100 includes one or more of each of a number of components, but may include fewer or additional components than shown in FIG. 1. As shown, the LIDAR system 100 includes optical circuits 101 implemented on a photonics chip. The optical circuits 101 may include a combination of active optical components and passive optical components. Active optical components may generate, amplify, and/or detect optical signals and the like. In some examples, the active optical components include optical beams at different wavelengths, and include one or more optical amplifiers, one or more optical detectors, or the like.

Free space optics 115 may include one or more optical waveguides to carry optical signals, and route and manipulate optical signals to appropriate input/output ports of the active optical components. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. The optical scanner 102 also collects light incident upon any objects in the environment into a return optical beam that is returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like. In some examples, the LIDAR control systems 110 may include memory to store data, and instructions to be executed by the processing device. The memory may be, for example, read-only memory (ROM), random-access memory (RAM, programmable read-only memory (PROM), erasable programmable read-only memory (EPROM), electrically erasable programmable read-only memory (EEPROM), flash memory, magnetic disk memory such hard disk drives (HDD), optical disk memory such as compact-disk read-only (CD-ROM) and compact disk read-write memory (CD-RW), or any other type of non-transitory memory.

In some examples, the LIDAR control systems 110 may include a signal processing unit 112 such as a DSP. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LIDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 2:
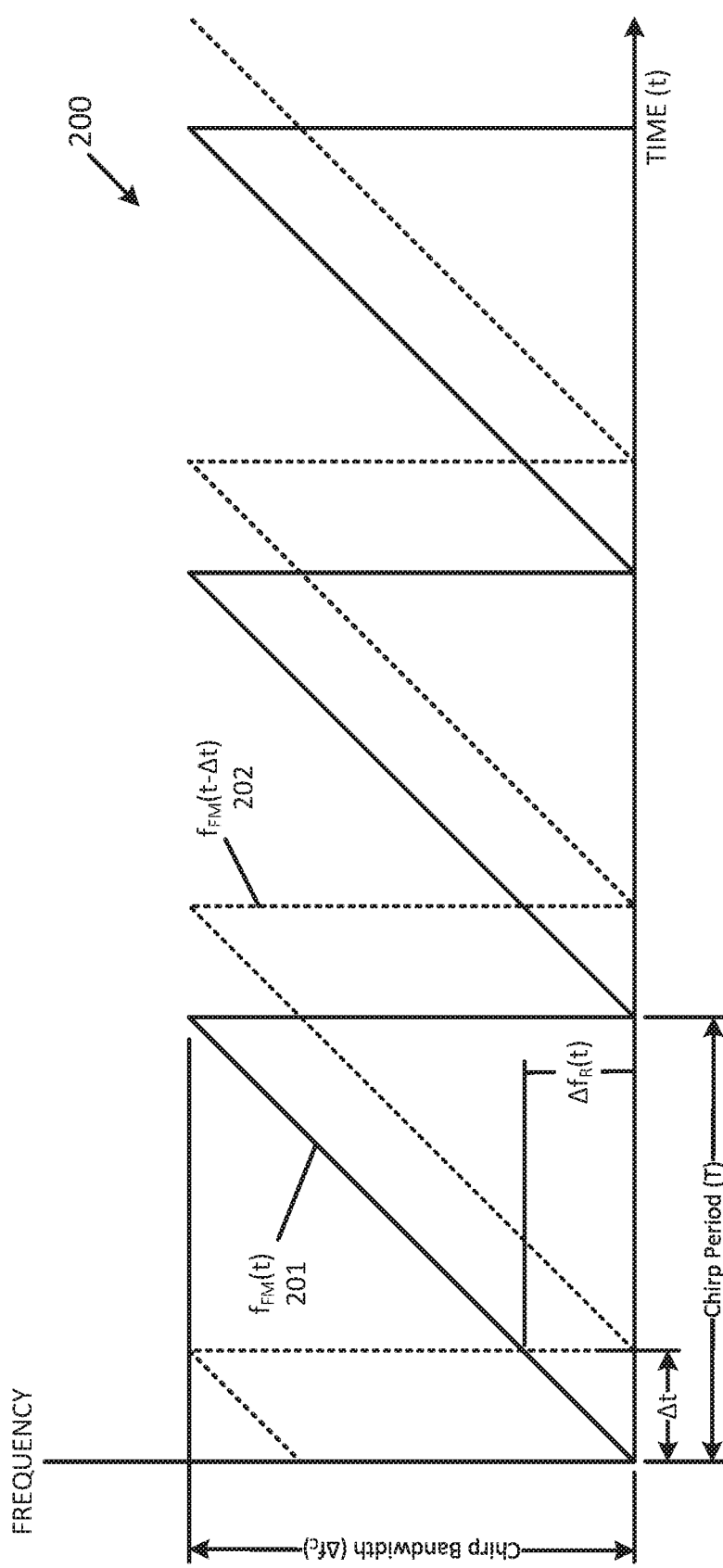
FIG. 2 is a time-frequency diagram illustrating one example of LIDAR waveforms according to the present disclosure.

FIG. 2 is a time-frequency diagram 200 of an FMCW scanning signal 201 that can be used by a LIDAR system, such as system 100, to scan a target environment according to some embodiments. In one example, the scanning waveform 201, labeled as $f_{FM}(t)$, is a sawtooth waveform (sawtooth "chirp") with a chirp bandwidth $\Delta f_C$ and a chirp period $T_C$. The slope of the sawtooth is given as $k=(\Delta f_C/T_C)$. FIG. 2 also depicts target return signal 202 according to some embodiments. Target return signal 202, labeled as $f_{FM}(t-\Delta t)$, is a time-delayed version of the scanning signal 201, where $\Delta t$ is the round trip time to and from a target illuminated by scanning signal 201. The round trip time is given as $\Delta t=2R/v$, where R is the target range and v is the velocity of the optical beam, which is the speed of light c. The target range, R, can therefore be calculated as $R=c(\Delta t/2)$. When the return signal 202 is optically mixed with the scanning signal, a range dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also includes a frequency offset (Doppler shift) if the target has a velocity relative to the LIDAR system 100. The Doppler shift can be determined separately, and used to correct the frequency of the return signal, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{R_{max}}$) is 500 megahertz. This limit in turn determines the maximum range of the system as $R_{max}=(c/2)(\Delta f_{R_{max}}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 3A:
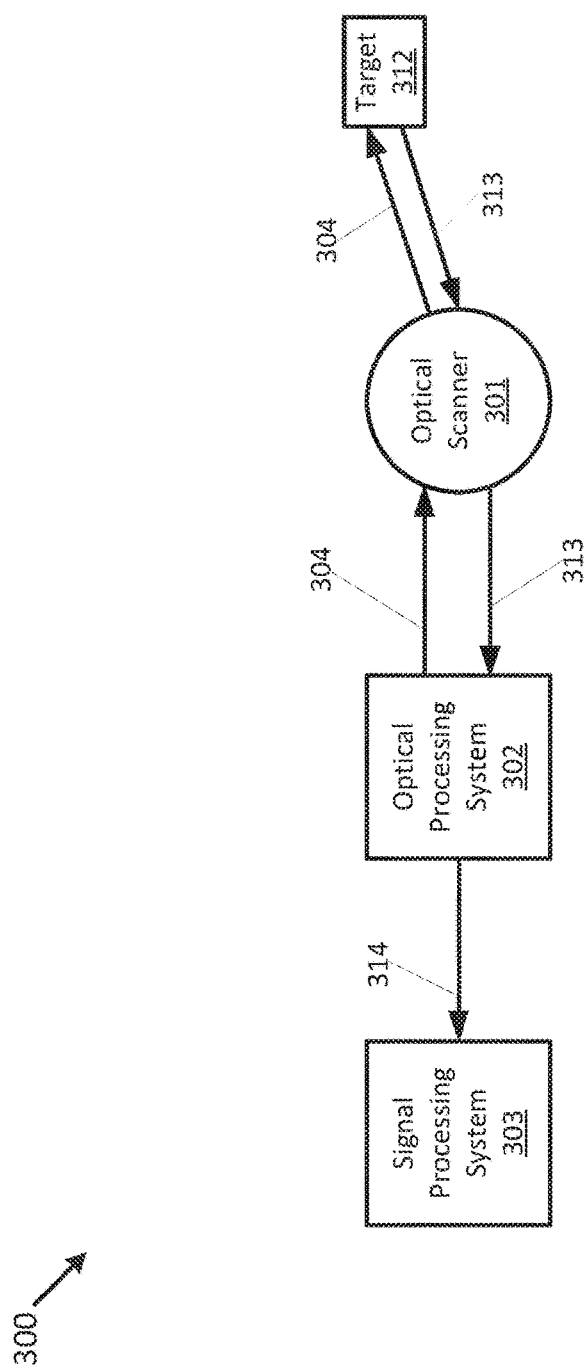
FIG. 3A is a block diagram illustrating an example LIDAR system according to the present disclosure.

FIG. 3A is a block diagram illustrating an example FMCW LIDAR system 300 according to the present disclosure. Example system 300 includes an optical scanner 301 to transmit an FMCW (frequency-modulated continuous wave) infrared (IR) optical beam 304 and to receive a return signal 313 from reflections of the optical beam 304 from targets such as target 312 in the field of view (FOV) of the optical scanner 301. System 300 also includes an optical processing system 302 to generate a baseband signal 314 in the time domain from the return signal 313, where the baseband signal 314 contains frequencies corresponding to LIDAR target ranges. Optical processing system 302 may include elements of free space optics 115, optical circuits 101, optical drivers 103 and optical receivers 104 in LIDAR system 100. System 300 also includes a signal processing system 303 to measure energy of the baseband signal 314 in the frequency domain, to compare the energy to an estimate of LIDAR system noise, and to determine a likelihood that a signal peak in the frequency domain indicates a detected target. Signal processing system 303 may include elements of signal conversion unit 106, signal conditioning unit 107, LIDAR control systems 110 and signal processing unit 112 in LIDAR system 100.

Figure 3B:
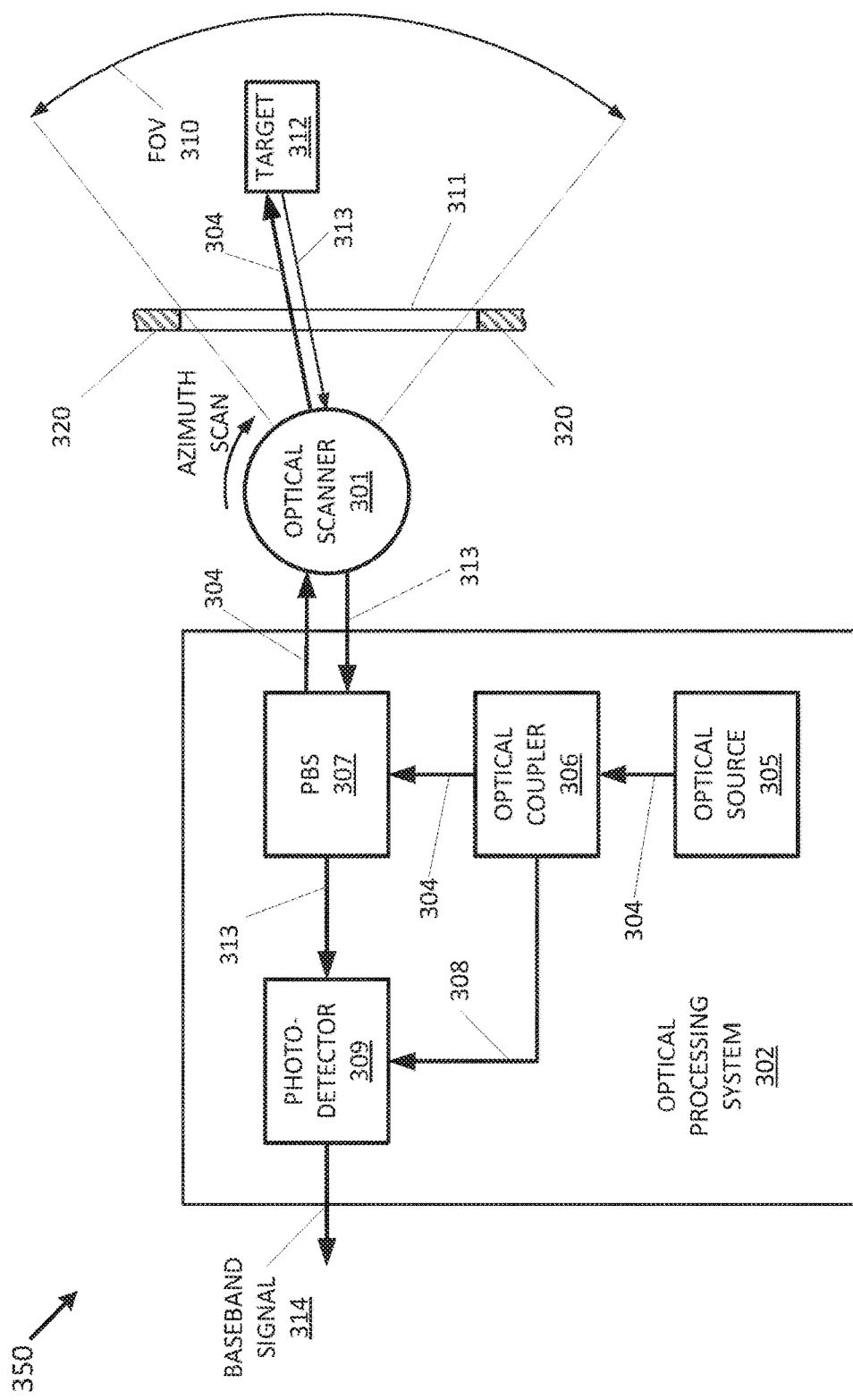
FIG. 3B is a block diagram illustrating an electro-optical optical system according to the present disclosure.

FIG. 3B is a block diagram illustrating an example electro-optical system 350. Electro-optical system 350 includes the optical scanner 301, similar to the optical scanner 102 illustrated and described in relation to FIG. 1. Electro-optical system 350 also includes the optical processing system 302, which as noted above, may include elements of free space optics 115, optical circuits 101, optical drivers 103, and optical receivers 104 in LIDAR system 100.

Electro-optical processing system 302 includes an optical source 305 to generate the frequency-modulated continuous-wave (FMCW) optical beam 304. The optical beam 304 may be directed to an optical coupler 306 that is configured to couple the optical beam 304 to a polarization beam splitter (PBS) 307 and a sample 308 of the optical beam 304 to a photodetector (PD) 309. The PBS 307 is configured to direct the optical beam 304, because of its polarization, toward the optical scanner 301. Optical scanner 301 is configured to scan a target environment with the optical beam 304, through a range of azimuth and elevation angles covering the field of view (FOV) 310 of a LIDAR window 311 in an enclosure 320 of the optical system 350. In FIG. 3B, for ease of illustration, only the azimuth scan is illustrated.

As shown in FIG. 3B, at one azimuth angle (or range of angles), the optical beam 304 passes through the LIDAR widow 311 and illuminates a target 312. A return signal 313 from the target 312 passes through LIDAR window 311 and is directed by optical scanner 301 back to the PBS 307.

The return signal 313, which will have a different polarization than the optical beam 304 due to reflection from the target 312, is directed by the PBS 307 to the photodetector (PD) 309. In PD 309, the return signal 313 is optically mixed with the local sample 308 of the optical beam 304 to generate a range-dependent baseband signal 314 in the time domain. The range-dependent baseband signal 314 is the frequency difference between the local sample 308 of the optical beam 304 and the return signal 313 versus time (i.e., $\Delta f_R(t)$).

FIG. 4 is a detailed block diagram illustrating an example of the signal processing system 303, which processes the baseband signal 314 according to some embodiments. As noted above, signal processing unit 303 may include elements of signal conversion unit 106, signal conditioning unit 107, LIDAR control systems 110 and signal processing unit 112 in LIDAR system 100.

Signal processing system 303 includes an analog-to-digital converter (ADC) 401, a time domain signal processor 402, a block sampler 403, a discrete Fourier transform processor 404, a frequency domain signal processor 405, and a peak search processor 406. The component blocks of signal processing system 303 may be implemented in hardware, firmware, software, or some combination of hardware, firmware and software.

In FIG. 4, the baseband signal 314, which is a continuous analog signal in the time domain, is sampled by ADC 401 to generate a series of time domain samples 315. The time domain samples 315 are processed by the time domain processor 402, which conditions the time domain samples 315 for further processing. For example, time domain processor 402 may apply weighting or filtering to remove unwanted signal artifacts or to render the signal more tractable for subsequent processing. The output 316 of time domain processor 402 is provided to block sampler 403. Block sampler 403 groups the time domain samples 316 into groups of N samples 317 (where N is an integer greater than 1), which are provided to DFT processor 404. DFT processor 404 transforms the groups of N time domain samples 317 into N frequency bins or subbands 318 in the frequency domain, covering the bandwidth of the baseband signal 314. The N subbands 319 are provided to frequency domain processor 405, which conditions the subbands for further processing. For example, frequency domain processor 405 may resample and/or average the subbands 319 for noise reduction. Frequency domain processor 405 may also calculate signal statistics and system noise statistics as described in greater detail below. The processed subbands 319 are then provided to a peak search processor 406 that searches for signal peaks representing detected targets in the FOV of the LIDAR system 300.

The subband signal 319 provided to the peak search processor 405 is the sum of the energy in the target return 313 and all of the noise contributed by the LIDAR system 300 as the target return signal is processed. Most electronic systems generally have sources of noise that limit the performance of those systems by creating a noise floor, which is the combined level of all sources of noise in the system. In order to be detected, a signal in an electronic system such as the subband signal 319, developed from the baseband signal 314, must be above the noise floor absent specialized signal processing techniques such as signal integration and noise averaging.

Sources of noise in a LIDAR system, such as LIDAR system 300, may include thermal noise, 1/f noise, shot noise, impulse noise, RIN (relative intensity noise associated with lasers), TIA (trans-impedance amplifier) noise, and ADC (analog-to-digital conversion) noise. These sources of noise are known to persons of ordinary skill in the art. System noise may be characterized, for example, by its energy versus frequency profile across frequency bins, by its first moments (mean) across the frequency bins, by its second moments (variance) across the frequency bins, by its third moment (asymmetry) across the frequency bins, and/or by its fourth moment (kurtosis, or the sharpness of peaks) across the frequency bins.

Figure 5:
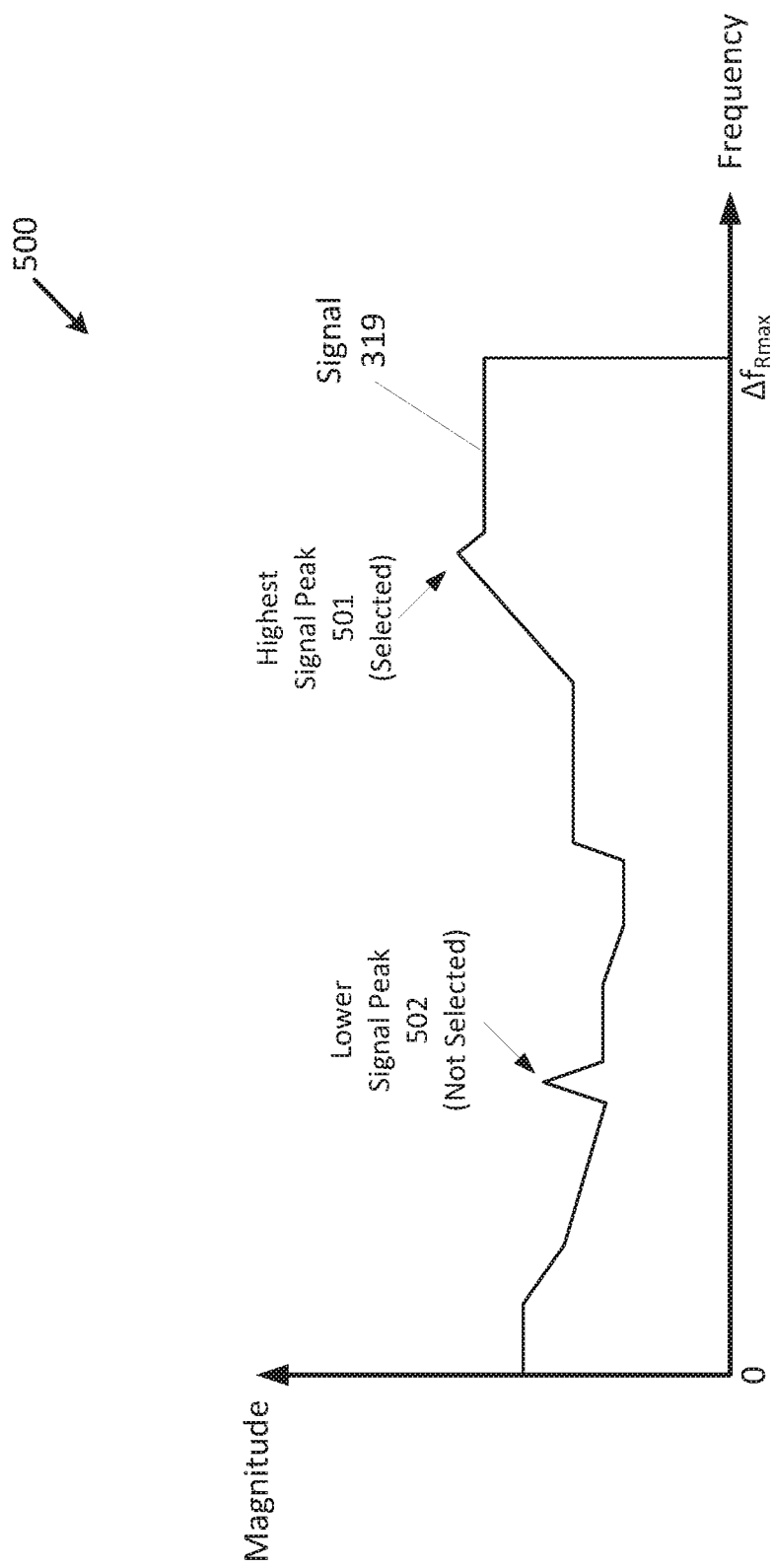
FIG. 5 is a signal magnitude-frequency diagram illustrating an example subband signal according to the present disclosure.

FIG. 5 is a diagram 500 illustrating magnitude versus frequency of the subband signal 319 that includes system noise, shown as a continuous waveform (rather than as discrete frequency bins or subbands) for ease of illustration. The frequencies span the range from 0 to $\Delta f_{Rmax}$. Without more information about the subband signal 319, the peak search processor 406 would select the highest signal peak 501 as the return most likely to indicate a target, and not select a lower signal peak 502, for example. However, if the peak search processor 406 had an estimate of the system noise, it could compare the subband signal 319 to the system noise estimate and could make a different or better selection based on additional selection criteria. In FIG. 5 (and subsequently in FIGS. 7-10), signal and noise values are depicted as energy versus frequency contours. However, as previously noted, the system noise may be additionally characterized by any of its first through fourth moments representing mean energy, energy variance, energy asymmetry and kurtosis versus frequency, respectively. In addition to energy alone, the baseband signal may be characterized in terms of autocorrelation statistics across the frequency bins in the baseband and/or cross-correlation statistics between the baseband signal and the system noise estimate across the frequency bins.

In one example, an estimate of system noise can be obtained by operating a LIDAR system, such as LIDAR system 300, in an anechoic (no-echo) calibration mode where there is no detectable return signal (e.g., return signal 313). This mode of operation generates all of the normal system noise mechanisms and results in a baseband signal 313 (and a subband signal 319 as well) that includes energy only from the system noise sources.

Figure 6C:
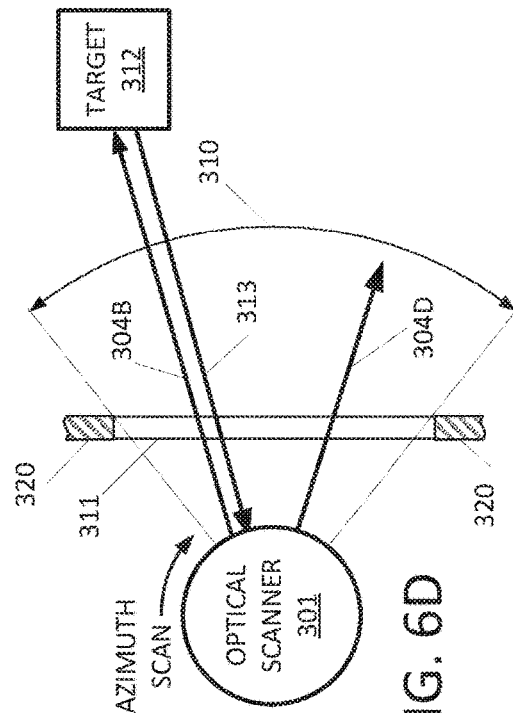
FIG. 6A-FIG. 6D are illustrations of example anechoic noise calibration methods according to the present disclosure.
Figure 6D:
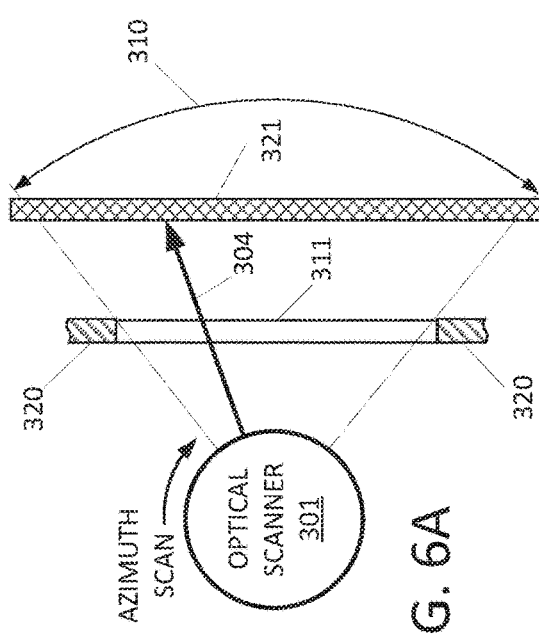
Figure 6B:
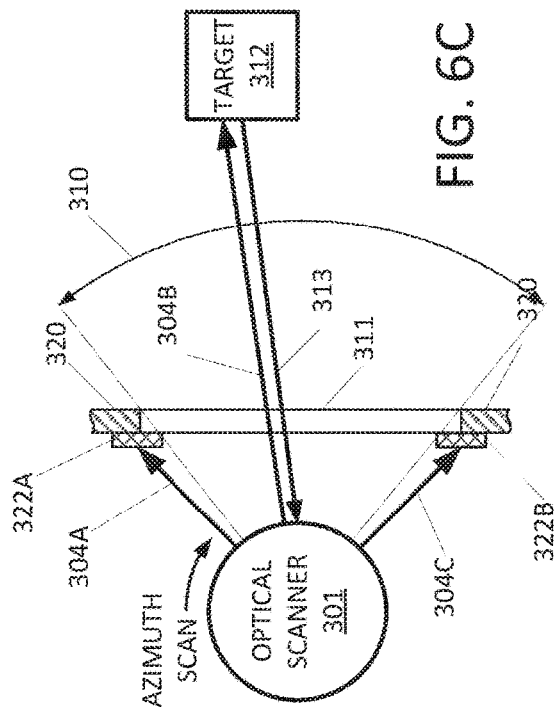
Figure 6A:
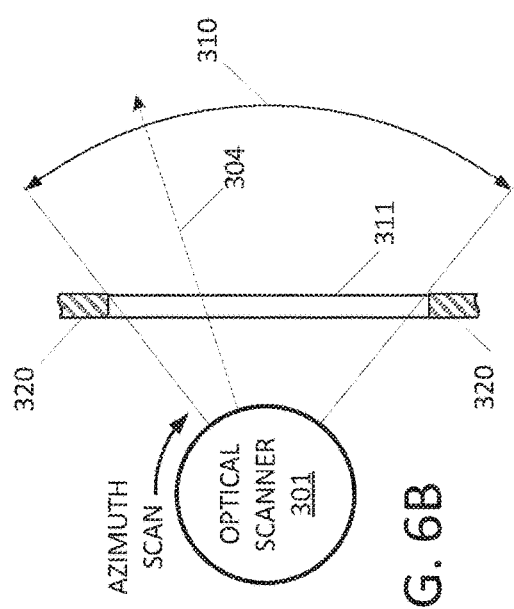

FIG. 6A illustrates an anechoic noise calibration that can be performed in a factory environment according to some embodiments. In FIG. 6A, an infrared (IR) absorber 321 is sized and located in front of the LIDAR window 311 to completely occlude the FOV 310 of the optical scanner 301 and absorb all of the energy in the optical beam 304.

FIG. 6B illustrates an anechoic noise calibration that can be performed in the field, in real time as the LIDAR system is booting up according to some embodiments. In this noise calibration, the power of the optical beam 304 is attenuated during system boot-up (signified by the dashed lightweight line in FIG. 6B) so that any reflection from an object in the FOV 310 of the optical scanner 301 is below the noise floor of the system and undetectable.

FIG. 6C illustrates an anechoic noise calibration that can be performed in the field, in real time, as the LIDAR system (e.g., LIDAR system 300) is operating according to some embodiments. In this noise calibration, the angular range of the optical scanner 301 is increased to exceed the FOV 310 provided by the LIDAR window 311, such that the optical beam 304 is periodically directed to IR absorbing materials 322A and 322B during the scan that are located within the system enclosure 320. As illustrated in FIG. 6C, during a first interval of time at the beginning of a scan, the optical beam 304 (identified as 304A) illuminates IR absorbing material 322A to generate an estimate of system noise. During a second interval of time, the optical beam 304 (identified as 304B) scans the FOV 310 of the LIDAR window 311, where it generates return signals such as return signal 313 from targets such as target 312. During a third interval of time, the optical beam 304 (designated as 304C) is absorbed by IR absorbing material 322B to generate another estimate of system noise. This calibration process can be repeated during each scan so the estimate of system noise is continually updated in real time.

FIG. 6D illustrates another anechoic calibration that can be performed in the field, in real time, as the LIDAR system is operating according to some embodiments. In this noise calibration, the optical scanner performs a normal scan within the FOV 310 of LIDAR window 311, but ignores locations within the FOV where signal returns from optical beam 304B indicate an obvious target (such as the return 313 from target 312) and records subband signals when the optical beam 304D is directed to an area in the FOV of optical scanner 301 that does not include a target. This method of calibration may be supported by video imaging devices such as imaging devices 108 in system 100 and image processing in image processing system 114 in system 100, for example.

Figure 7:
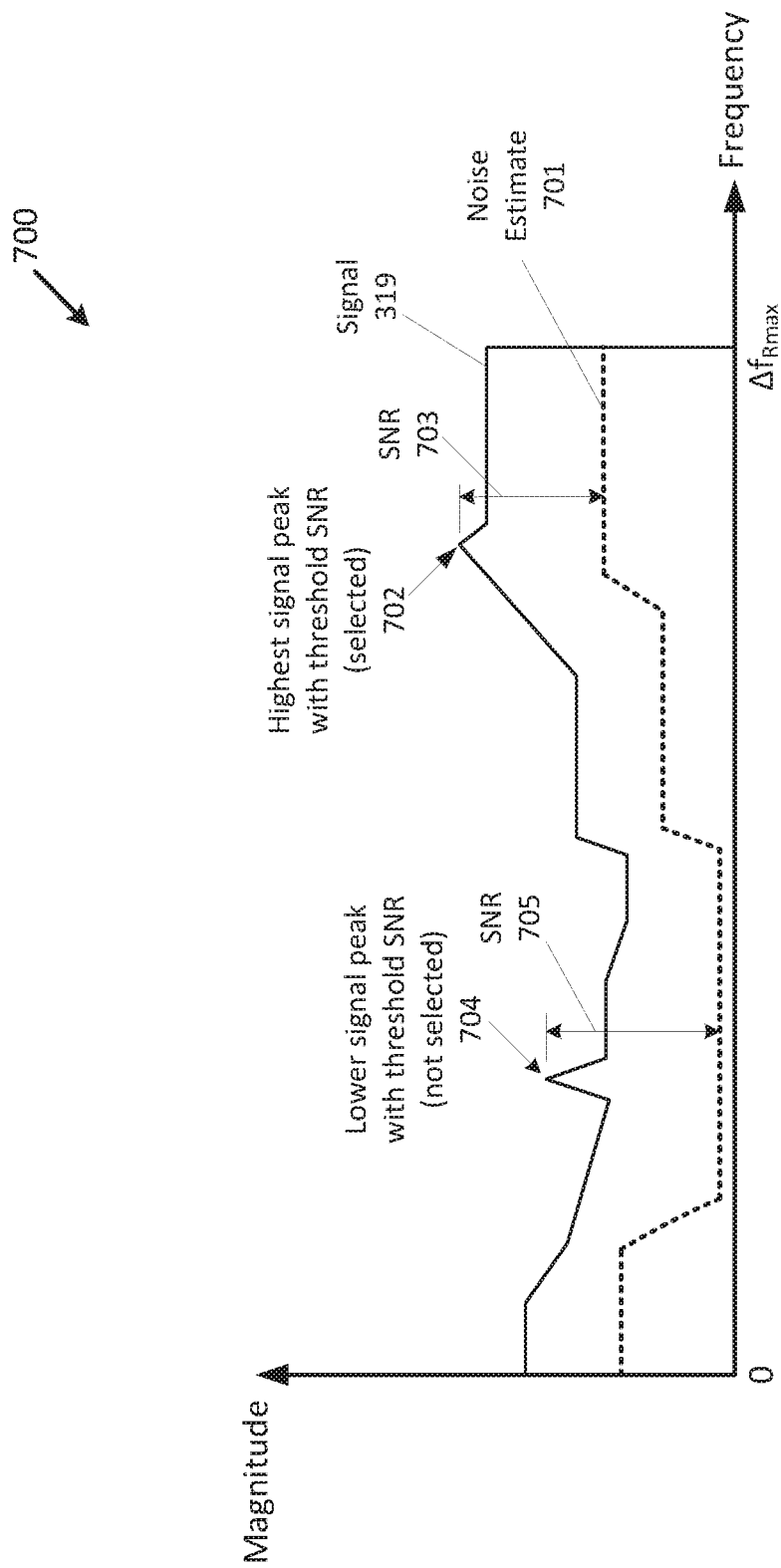
FIG. 7 is a signal magnitude-frequency diagram illustrating an example method of peak detection according to the present disclosure.

FIG. 7 is magnitude versus frequency diagram 700 of the subband signal 319 and a system noise estimate 701 from any one of the calibration methods illustrated in FIG. 6A through FIG. 6D. In the example of FIG. 7, the peak search processor 406 in the signal processing system 303 may be configured to select the highest signal peak with a signal-to-noise ratio (SNR) that exceeds a minimum threshold SNR. In FIG. 7, signal peak 702 has an SNR 703 that is above the threshold SNR, and signal peak 704 has an SNR 705 that is also above the threshold SNR. Given the selection criteria cited above, the peak search processor 406 would select signal peak 702 and would not select signal peak 704 because signal peak 702 is higher than signal peak 704.

Figure 8:
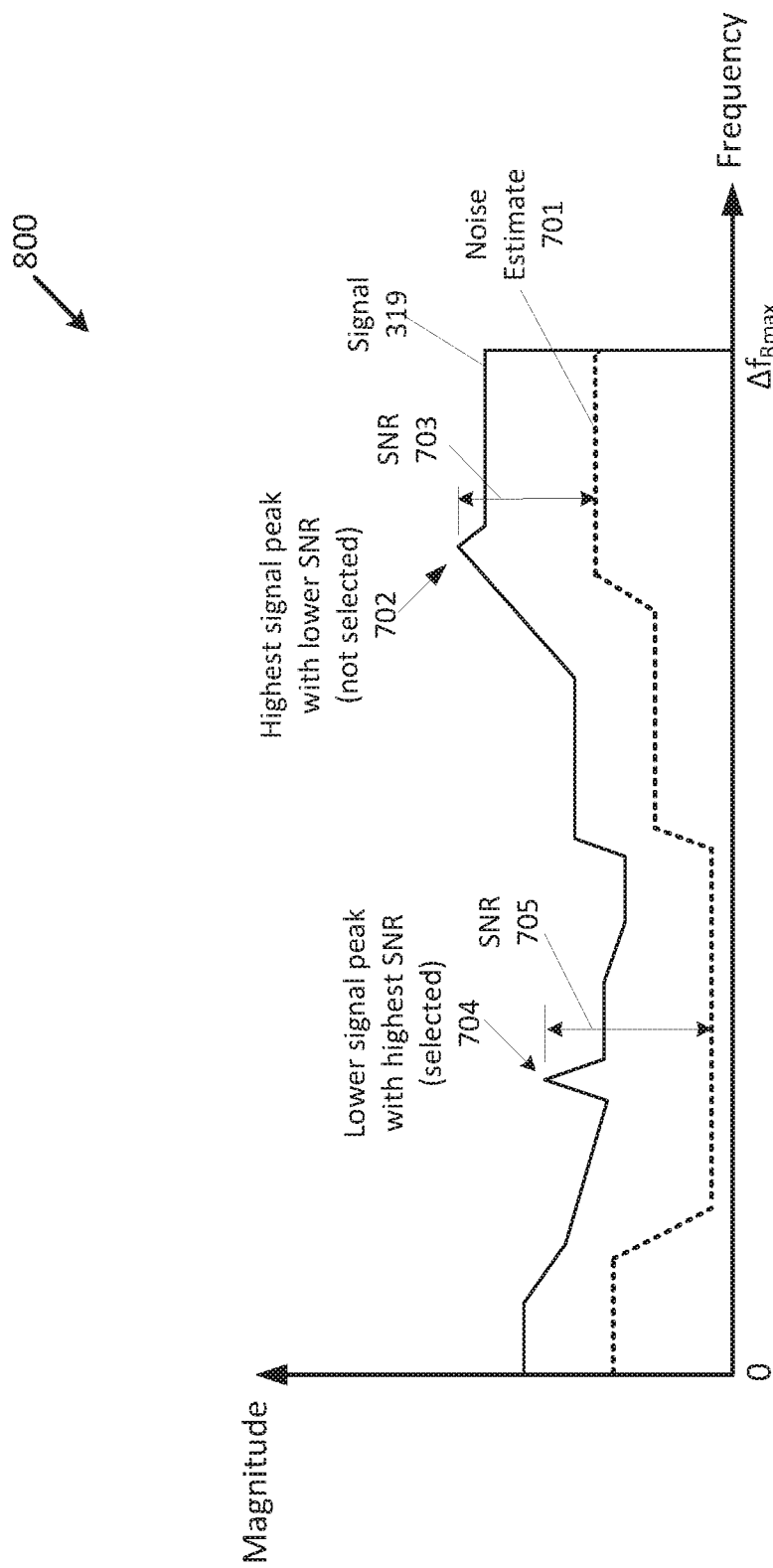
FIG. 8 is a signal magnitude-frequency diagram illustrating an example method of peak detection according to the present disclosure.

FIG. 8 is a magnitude versus frequency diagram 800 of the subband signal 319 and the system noise estimate 701 with different peak selection criteria. In the example of FIG. 8, the peak search processor 406 may be configured to select the signal peak with the highest SNR regardless of energy level. Under this selection criteria, signal peak 702 is not selected, even though it has the highest peak energy, because it has a lower SNR 703 than the SNR 705 associated with signal peak 704.

Figure 9:
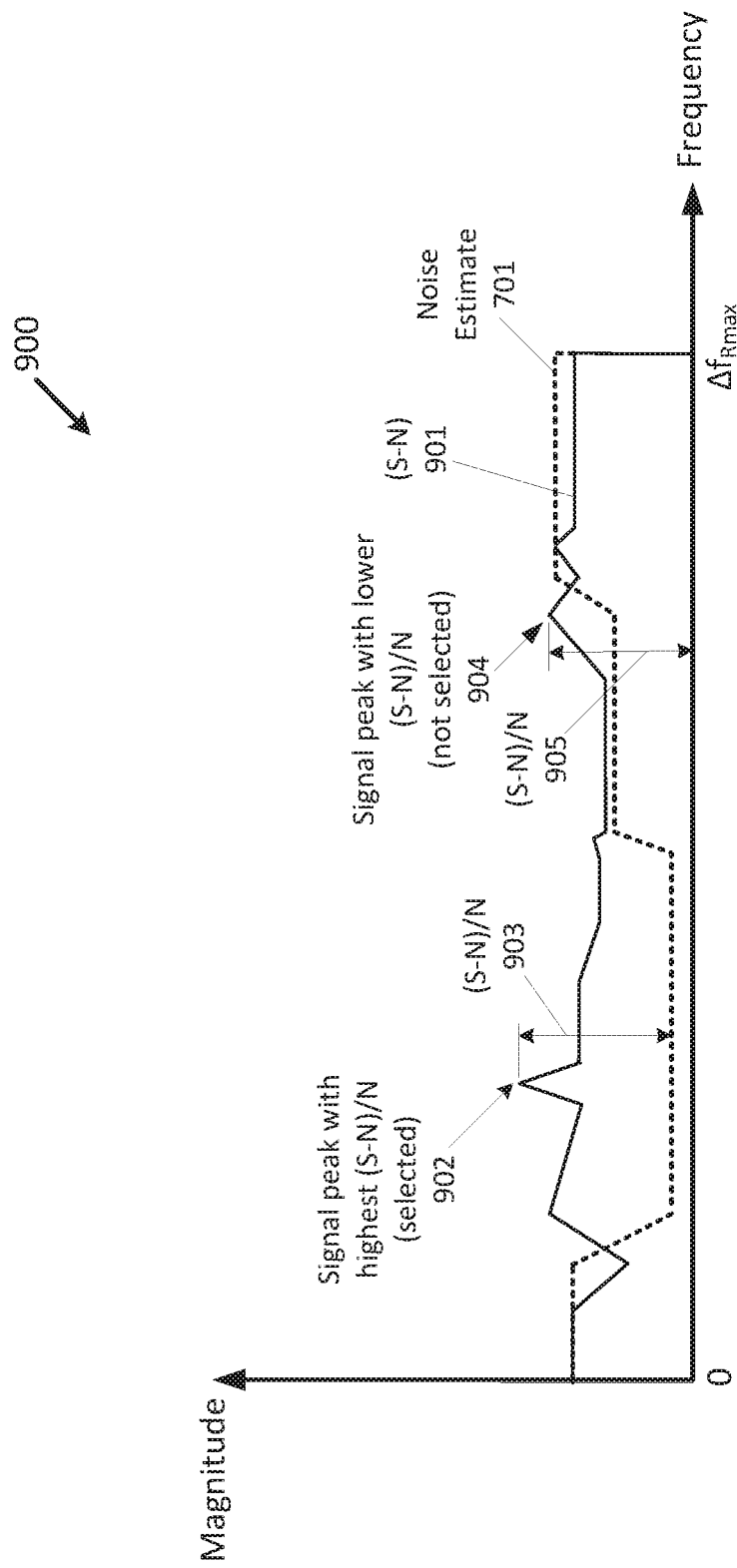
FIG. 9 is a signal magnitude-frequency diagram illustrating an example method of peak detection according to the present disclosure.

FIG. 9 is an energy versus frequency diagram 900 comparing the noise estimate 701 to the difference between the signal 319 and the noise estimate 701, diagrammed in FIG. 9 as signal minus noise (S–N) 901. In the example of FIG. 9, the peak selection processor 406 may be configured to select the signal peak with the highest non-negative signal minus noise to noise ratio (S–N)/N. Under this selection criteria, signal peak 902 with (S–N)/N 903 would be selected over signal peak 904 with (S–N)/N 905 because (S–N)/N 903 is larger than (S–N)/N 905.

In some examples, the signal processing system 303 may be configured to modify the subband signal (e.g., signal 319) and the system noise estimate (e.g., system noise estimate 701) to improve the likelihood that a signal peak in the frequency domain indicates a detected target and to decrease the likelihood that a signal peak in the frequency domain from a false target will be interpreted as a real target. As noted above, signal processing system 303, and frequency domain processor 405 in particular, may be configured to calculate statistics of the system noise estimate for subsequent processing. For example, frequency domain processor 405 may calculate the variance of noise in each frequency subband (frequency bin) generated by DFT processor 404. In one example, frequency domain processor may also calculate the covariance of noise across frequency bins. In one example, frequency domain processor 405 may also calculate any moment of the noise (e.g., a first moment or second moment of the noise energy with respect to frequency, analogous to a center of gravity or a moment of inertia of a system of masses). In one example, frequency domain processor 405 may also track peak power over time in each frequency bin to capture random impulse noise.

Figure 10:
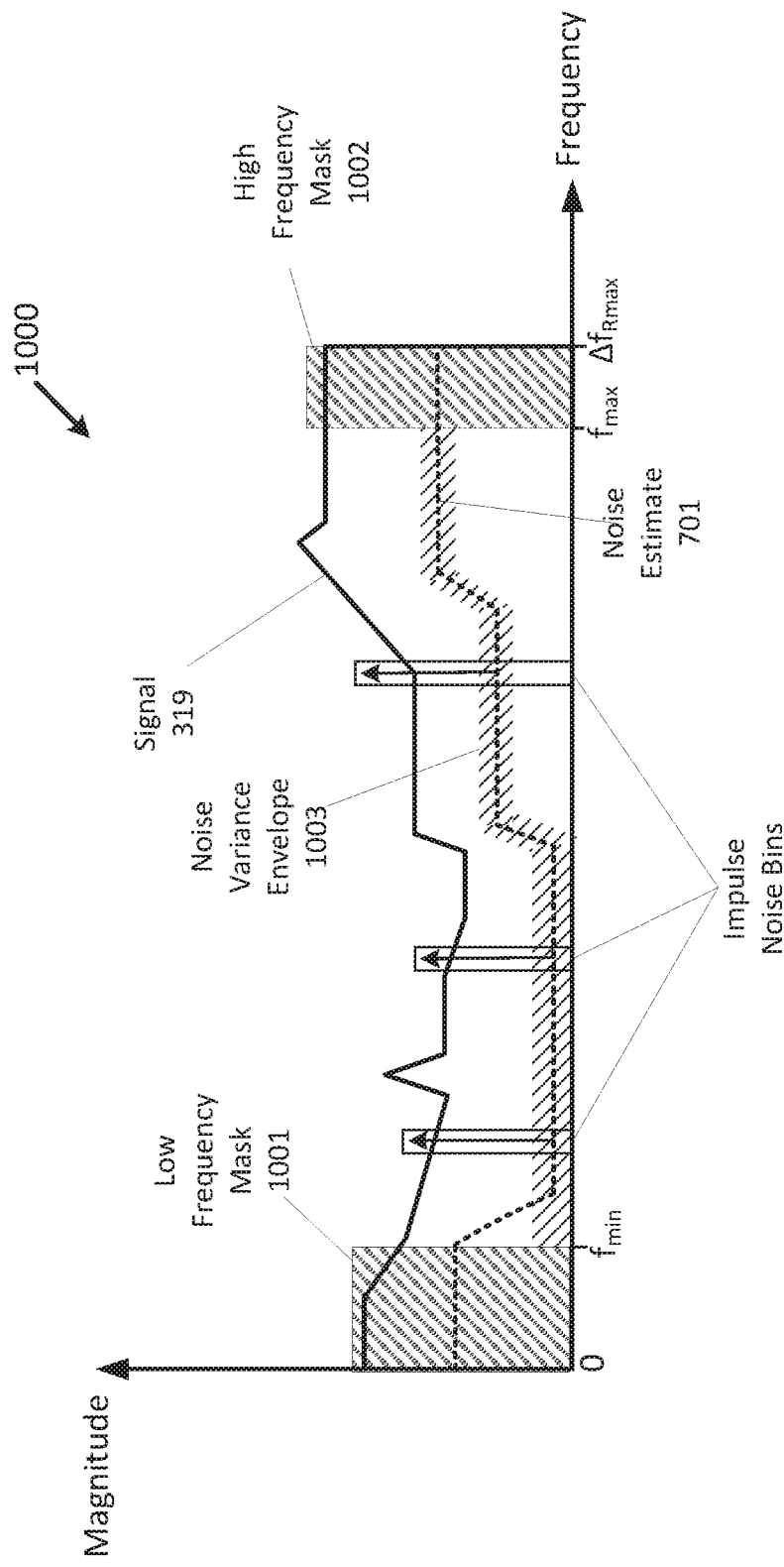
FIG. 10 is a signal magnitude-frequency diagram illustrating example signal processing techniques according to the present disclosure.

FIG. 10 is an energy versus frequency diagram 1000 illustrating some additional signal processing techniques for improving target detection. For example, internal reflections in optical processing system 302 may cause low frequency artifacts in the baseband signal 314, due to their short range, which could show up as false targets. In one example, frequency domain processor 405 may be configured to mask frequencies below a minimum threshold frequency ($f_{min}$) in the subband signal 319 with a low frequency mask 1001 to mitigate the effects of the internal reflections by removing them.

In another example, targets at or near the maximum range of the LIDAR system (e.g., systems 100 or 300), may have velocities that add or subtract a Doppler frequency shift to the baseband signal, periodically pushing the corresponding baseband frequency beyond $\Delta f_{Rmax}$, that can appear as intermittent low frequency aliasing, or range jumping where the target appears to jump from a long range to a close range, and back in a short period of time. In one example, frequency domain processor 405 may be configured to mask frequencies above a maximum threshold frequency ($f_{max}$) in the subband signal 319 with a high frequency mask 1002 to mitigate the effects of target velocity changes for targets at or near the maximum range of the LIDAR system.

One or more noise sources in system 100 or system 300 may be non-stationary (i.e., time varying), so that a one-time noise calibration may not generate an accurate estimate of the probable variance of system noise in each frequency bin. As described above, frequency domain processor 405 may be configured to calculate the variance of system noise in each frequency bin. In one example, frequency domain processor 405 may also be configured to increase the variance or covariance of the noise estimate 701 across frequency bins to compensate for non-stationary noise sources, as illustrated by the noise variance envelope 1003 in FIG. 10.

One or more noise sources in system 100 or system 300 may include impulse noise, which is typically random noise spikes from external sources (e.g., lightning, power surges, and other unpredictable energy discharges). In one example, the frequency domain processor 405 may include processes that track impulse noise in a database and then masks the frequency bin where the impulse noise was recorded.

It will be appreciated that references herein to frequencies in the baseband signal 314, and frequencies in the subband signal 319, may refer interchangeably to the same frequencies such that any reference to the baseband signal 314 does not exclude the subband signal 319 and that any reference to the subband signal 319 does not exclude the baseband signal 314.

Figure 11:
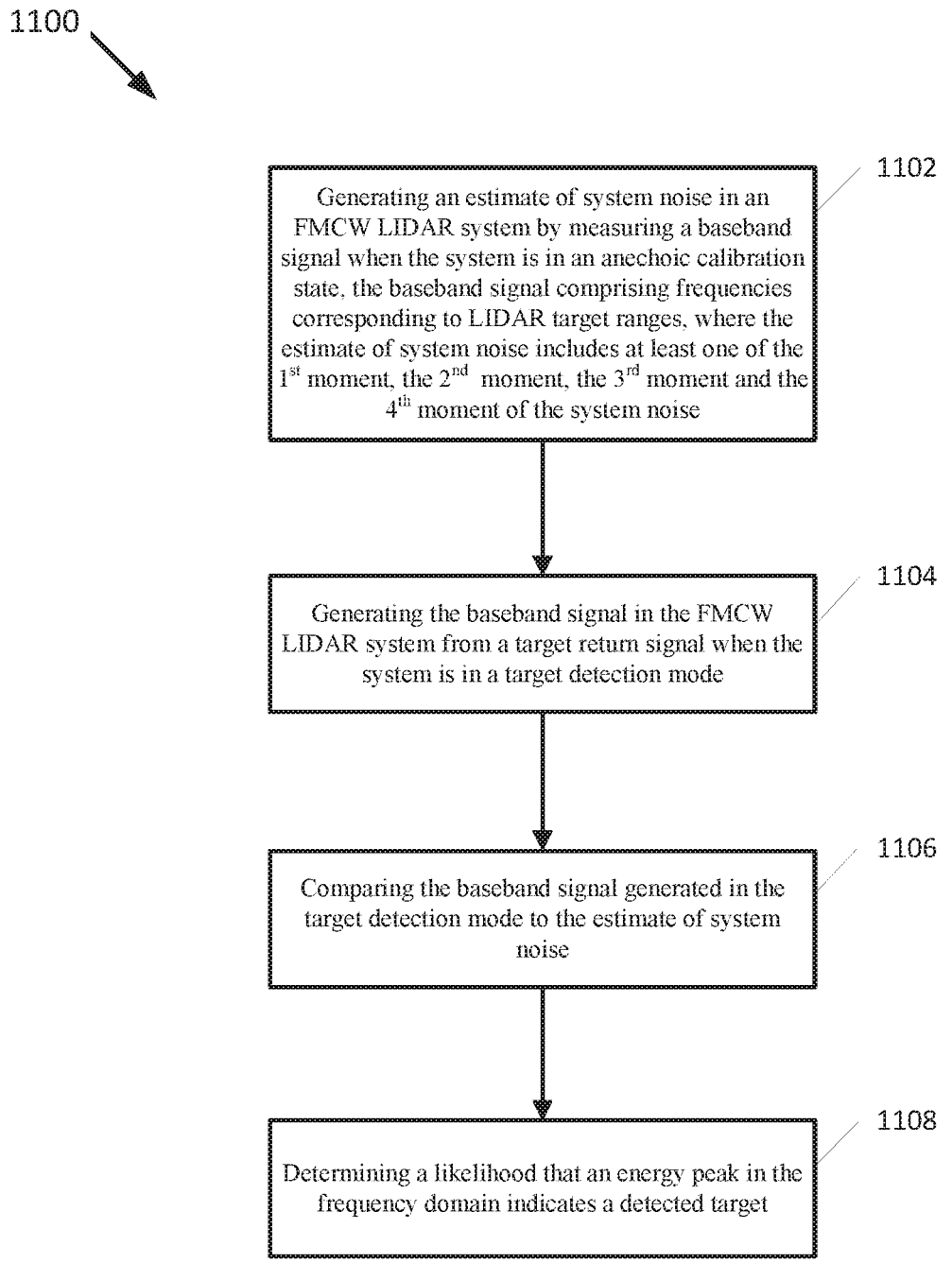
FIG. 11 is a flowchart illustrating a method for noise calibration and target detection according to the present disclosure.

FIG. 11 is a flowchart illustrating a method 1100 in a LIDAR system, such as LIDAR system 100 or LIDAR system 300, for noise calibration and compensation according to the present disclosure. Method 1100 begins at operation 1102: generating an estimate of system noise (e.g., noise estimate 701) in an FMCW LIDAR system by measuring a baseband signal (e.g., baseband signal 314) when the system is in an anechoic calibration state (e.g., as illustrated in FIGS. 6A through 6D), where the baseband signal includes frequencies corresponding to LIDAR target ranges, where the estimate of system noise includes at least one of the $1^{st}$ moment, the $2^{nd}$ moment, the $3^{rd}$ moment and the $4^{th}$ moment of the system noise. Method 1100 continues at operation 1104: generating the baseband signal in the FMCW LIDAR system from a target return signal (e.g., target return signal 313) when the system is in a target detection mode. Method 1100 continues at operation 1106: comparing the baseband signal generated in the target detection mode to the estimate of system noise. And method 1100 concludes at operation 1108: determining a likelihood that a signal peak in the frequency domain indicates a detected target (e.g., by using any of the selection methods and compensation techniques illustrated in and described above with respect to FIG. 5, 7, 8, 9 or 10).

Figure 12:
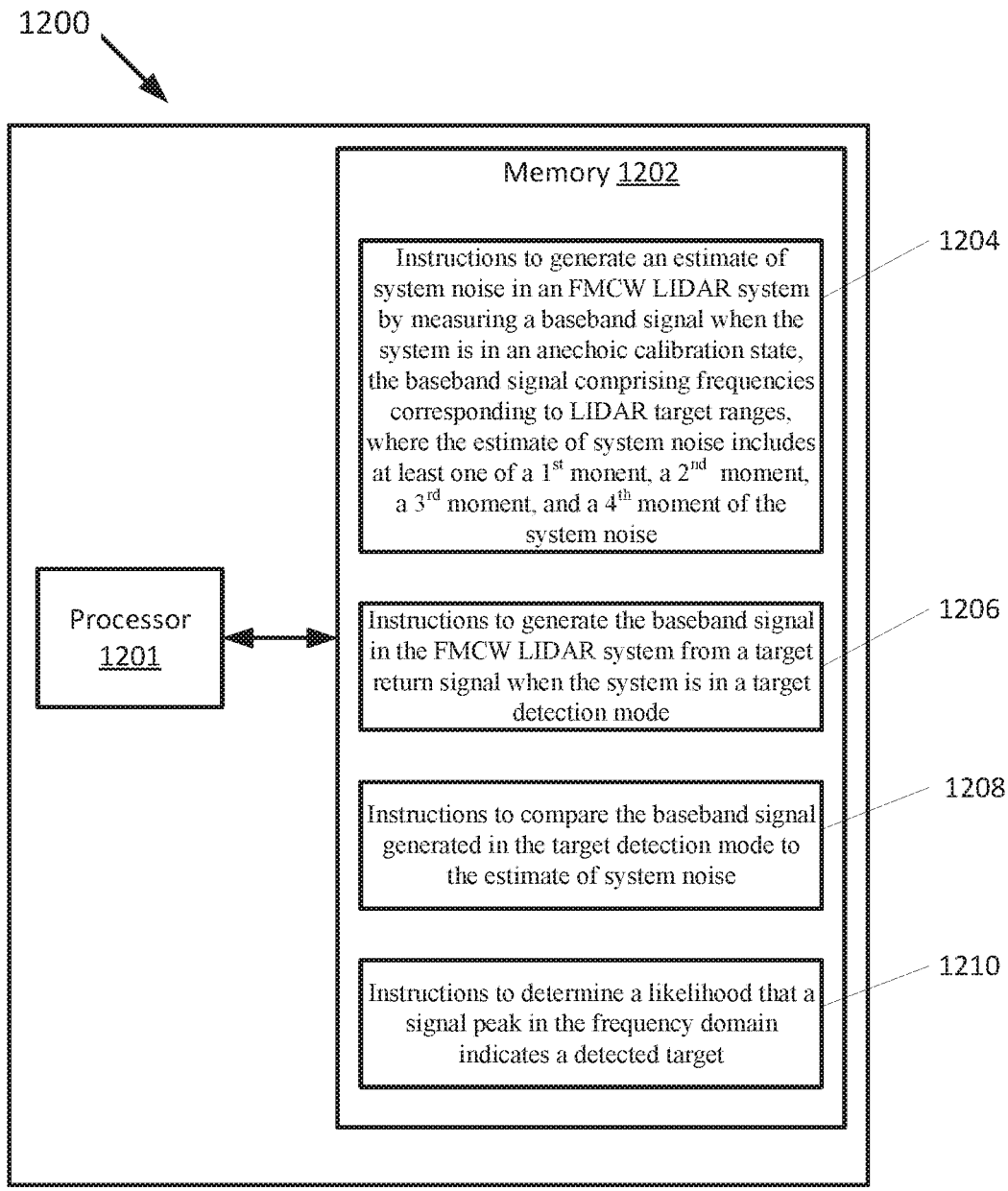
FIG. 12 is a block diagram of an example signal processing system according to the present disclosure.

FIG. 12 is a block diagram of a processing system 1200 (e.g., similar to signal processing system 303 illustrated and described above with respect to FIG. 4) in a LIDAR system such as LIDAR system 100 or LIDAR system 300. Processing system 1200 includes a processor 1201, which may be any type of general purpose processing device or special purpose processing device designed for use in the LIDAR system. Processing device 1201 is coupled with a memory 1202, which can be any type of non-transitory computer-readable medium (e.g., RAM, ROM, PROM, EPROM, EEPROM, flash memory, magnetic disk memory or optical disk memory) containing instructions that, when executed processor 1201 in the LIDAR system, cause the LIDAR system to perform the method described herein. In particular, memory 1202 includes instructions 1204 to generate an estimate of system noise (e.g., 701) in a LIDAR system (e.g., 100, 300) by measuring a baseband signal (e.g., 314) when the system is in an anechoic calibration state as described herein, where the baseband signal includes frequencies corresponding to LIDAR target ranges, where the estimate of system noise includes at least one of the $1^{st}$ moment, the $2^{nd}$ moment, the $3^{rd}$ moment and the $4^{th}$ moment of the system noise. Non-transitory computer-readable memory 1202 also includes instructions 1206 to generate the baseband signal in the LIDAR system from a target return signal (e.g., 313) when the system is in a target detection mode as described herein. Non-transitory computer-readable memory 1202 also includes instructions 1208 to compare the baseband signal generated in the target detection mode to the estimate of system noise as described herein. And finally, non-transitory computer-readable medium 1202 includes instructions 1210 to determine a likelihood that a signal peak in the frequency domain indicates a detected target as described herein.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A method, comprising:
generating, in a light detection and ranging (LIDAR) system, a baseband signal from a target return signal when the LIDAR system is in a target detection mode;
generating an estimate of system noise in the LIDAR system by measuring the baseband signal when the LIDAR system is in an anechoic calibration state, the baseband signal comprising frequencies corresponding to LIDAR target ranges;
comparing signal peaks of the generated baseband signal to the estimate of the system noise in a frequency domain; and
determining a likelihood that a signal peak, from the signal peaks, indicates a detected target.

2. The method of claim 1, wherein the anechoic calibration state comprises one of an anechoic factory calibration state, a low-power boot-up calibration state, the anechoic calibration state in an occluded field of view (FOV), or a target-absent calibration state, and wherein the signal peaks are based on one or more of signal energy across frequency bins of the baseband signal, autocorrelation of the baseband signal across the frequency bins, and cross-correlation between the baseband signal and the estimate of the system noise across the frequency bins.

3. The method of claim 2, wherein the estimate of the system noise further comprises a measurement of one or more of a noise energy, a mean of the noise energy, a variance of the noise energy, an asymmetry of the noise energy, and a kurtosis of the noise energy.

4. The method of claim 3, wherein generating the estimate of the system noise when the LIDAR system is in the anechoic calibration state comprises absorbing an infrared (IR) optical beam of the LIDAR system with an external IR absorber that occludes the FOV of the LIDAR system.

5. The method of claim 3, wherein generating the estimate of the system noise when the LIDAR system is in the low-power boot-up calibration state comprises lowering an energy of an infrared (IR) optical beam of the LIDAR system to a level that prevents detection of a target in the FOV of the LIDAR system.

6. The method of claim 3, wherein generating the estimate of the system noise when the LIDAR system is in the anechoic calibration state in the occluded FOV comprises directing an infrared (IR) optical beam of the LIDAR system to an IR absorber in the occluded FOV.

7. The method of claim 3, wherein generating the estimate of the system noise when the LIDAR system is in the target-absent calibration state comprises directing an infrared (IR) optical beam of the LIDAR system to a location in the FOV of the LIDAR system without a reflecting target.

8. The method of claim 3, wherein determining the likelihood that the signal peak in the frequency domain indicates the detected target comprises selecting a highest signal peak independent of the estimate of the system noise.

9. The method of claim 3, wherein determining the likelihood that the signal peak in the frequency domain indicates the detected target comprises selecting a highest signal that exceeds a signal-to-noise threshold based on the estimate of the system noise.

10. The method of claim 3, wherein determining the likelihood that the signal peak in the frequency domain indicates a detected target comprises selecting a first signal peak with a highest signal-to-noise ratio based on the estimate of the system noise.

11. The method of claim 3, wherein determining the likelihood that the signal peak in the frequency domain indicates the detected target comprises selecting a first signal peak with a highest non-negative signal minus noise to noise [(S-N)/N] ratio based on the estimate of the system noise.

12. The method of claim 3, wherein determining the likelihood that a signal peak in the frequency domain indicates a detected target comprises at least one of:
masking frequencies below a minimum threshold frequency in the baseband signal to mitigate internal reflections in the LIDAR system;
masking frequencies above a maximum threshold frequency in the baseband signal to mitigate aliasing due to Doppler shifts;
increasing a variance of the estimate of the system noise to compensate for non-stationary noise; or
tracking impulse noise in a database and mask corresponding frequencies in the baseband signal.

13. The method of claim 1, wherein the LIDAR system is a frequency-modulated continuous wave (FMCW) LIDAR system.

14. A non-transitory computer-readable medium containing instructions that, when executed by a processor in a light detection and ranging (LIDAR) system, cause the LIDAR system to:
generate an estimate of system noise in the LIDAR system by measuring a baseband signal when the LIDAR system is in an anechoic calibration state, the baseband signal comprising frequencies corresponding to LIDAR target ranges, wherein the estimate of the system noise comprises one or more of a noise energy and one or more moments of the noise energy;

generate the baseband signal in the LIDAR system from a target return signal when the LIDAR system is in a target detection mode;

compare signal peaks of the generated baseband signal to the estimate of the system noise in a frequency domain; and determine a likelihood that a signal peak, from the signal peaks, indicates a detected target.

15. The non-transitory computer-readable medium of claim 14, wherein the LIDAR system is a frequency-modulated continuous wave (FMCW) LIDAR system.

16. The non-transitory computer-readable medium of claim 15, wherein the one or more moments of the noise energy comprises a first moment of the noise energy comprising a mean, a second moment of the noise energy comprising a variance, a third moment of the noise energy comprising an asymmetry, and a fourth moment of the noise energy comprising a kurtosis.

17. The non-transitory computer-readable medium of claim 15, wherein the signal peaks are based on one or more of signal energy across frequency bins of the baseband signal, autocorrelation of the baseband signal across the frequency bins, and cross-correlation between the baseband signal and the estimate of the system noise across the frequency bins.

18. The non-transitory computer-readable medium of claim 15, wherein to determine the likelihood that the signal peak in the frequency domain indicates the detected target, the instructions, when executed by the processor in the LIDAR system, cause the LIDAR system to select a highest signal peak independent of the estimate of the system noise.

19. The non-transitory computer-readable medium of claim 14, wherein the estimate of the system noise further comprises one or more of a mean of the noise energy, a variance of the noise energy, an asymmetry of the noise energy, or a kurtosis of the noise energy.

20. The non-transitory computer-readable medium of claim 15, wherein to generate the estimate of the system noise when the LIDAR system is in the anechoic calibration state, the instructions, when executed by the processor in the LIDAR system, cause the LIDAR system to absorb an infrared (IR) optical beam of the system with an external IR absorber that occludes a field of view (FOV) of the LIDAR system.

* * * * *